United States Patent [19]

Navarro

[11] Patent Number: 4,523,672

[45] Date of Patent: Jun. 18, 1985

[54] METHOD FOR THE TRANSVERSE CONVEYING OF STRAND SECTIONS OF A MULTI-STRAND CONTINUOUS CASTING INSTALLATION AND TRANSVERSE CONVEYING APPARATUS FOR A MULTI-STRAND CASTING INSTALLATION

[75] Inventor: Carlos R. Navarro, Barcelona, Spain

[73] Assignee: Concast AG, Zurich, Switzerland

[21] Appl. No.: 390,390

[22] Filed: Jun. 21, 1982

[30] Foreign Application Priority Data

Jun. 30, 1981 [CH] Switzerland ................... 4283/81

[51] Int. Cl.³ ............................................. B65G 47/31
[52] U.S. Cl. .................................. 198/461; 198/744; 198/462
[58] Field of Search ............... 198/462, 744, 740, 741, 198/461, 459, 742, 792

[56] References Cited

U.S. PATENT DOCUMENTS

| 3,062,353 | 11/1962 | Opperthauser | 198/742 |
| 3,301,374 | 1/1967 | Proctor | 198/792 |
| 3,417,852 | 12/1968 | Kidd | 198/742 |
| 3,826,349 | 7/1974 | Stevenson, III | 198/744 |
| 3,970,008 | 7/1976 | Borsuk et al. | 198/740 |
| 4,202,440 | 5/1980 | Niki | 198/744 |
| 4,248,563 | 2/1981 | Fur | 198/744 |
| 4,314,630 | 2/1982 | Greenwood, Jr. | 198/744 |

FOREIGN PATENT DOCUMENTS

| 1816914 | 5/1976 | Fed. Rep. of Germany | 198/459 |
| 1313755 | 4/1973 | United Kingdom | 198/744 |
| 2079711 | 1/1982 | United Kingdom | 198/741 |
| 524747 | 10/1976 | U.S.S.R. | 198/744 |

Primary Examiner—Joseph E. Valenza
Assistant Examiner—Daniel R. Alexander
Attorney, Agent, or Firm—Werner W. Kleeman

[57] ABSTRACT

For a multi-strand continuous casting installation there is proposed accomplishing the transverse conveying or transfer of the cut strand sections, not as was heretofore conventional practice by a single clearing or removal movement occurring over the entire width of the installation, rather by a number of successive partial conveying strokes or movements, wherein the strand section is displaced from its starting position either through the distance (s) or the distance (s'). Consequently, there is required for each strand section a number of shorter partial conveying strokes or displacement movements corresponding to the ordinal number of the strand from which it is derived, and thus, during cutting of shorter strand sections the clearing time can be better accommodated to the cycling of the cutting operation. The displacement paths, depending upon the technique employed, amount to either $s = d \cdot (N-1)/N$ or $s' = d \cdot N/(N+1)$, wherein N constitutes the number of strands and d their spacing.

The apparatus for performing the method contains transport carriages possessing pivotable pawls which perform the displacement paths driven by a lever mechanism.

16 Claims, 4 Drawing Figures

METHOD FOR THE TRANSVERSE CONVEYING OF STRAND SECTIONS OF A MULTI-STRAND CONTINUOUS CASTING INSTALLATION AND TRANSVERSE CONVEYING APPARATUS FOR A MULTI-STRAND CASTING INSTALLATION

BACKGROUND OF THE INVENTION

The present invention relates to a new and improved method for the transverse conveying or transfer of strand sections of a multi-strand continuous casting installation onto an adjacently situated cooling bed, and additionally pertains to an improved construction of transverse conveying apparatus for a multi-strand continuous casting installation containing a multiplicity of transport elements, particularly transport pawls, which can be brought along a displacement path out of a rest position into an end or terminal position.

There are known to the art the most different constructions or transverse conveyor apparatuses which, in principle, can be classified into two categories or classes. The first category encompasses equipment which is only operatively correlated to a single cast strand or casting, and in the case of continuous casting installations for a plurality of cast strands there are also provided a number of transverse conveyor apparatuses which convey the finished strand sections, for instance billets or blooms, onto different cooling beds. Such type of installations are unfavorable from the standpoint of their economics. To the extent that such type of equipment design is not promoted for other reasons, there are usually presently employed transverse conveyor apparatuses which simultaneously convey or outfeed a respective strand section for each strand transversely to the roller direction of the severed strand section.

To that end there are provided different constructional designs. For instance, by means of a closed travelling chain equipped with a gripper there is engaged the outermost strand section and such is transversely shifted until all strand sections come to lie adjacent one another laterally of the roller tables.

In German Patent Publication No. 1,816,914, published July 2, 1970 there is known to the art, for instance, a transverse conveyor apparatus for billets which contains a carriage which is moved to-and-fro by a closed or endless traction cable and which is equipped with a number of transport pawls corresponding to the number of strands. During the transverse displacement of the carriage or dolly the transport pawls are upwardly tilted from a non-engaging or ineffectual position into an engaging or effective position. This movement is specifically accomplished in such a manner that initially the last pawl and only by virtue of the engagement of a billet by this last pawl is there upwardly tilted the next forward pawl and so forth, until all of the pawls have engaged a respective billet which are then conjointly displaced in such manner in a clearing or removal movement from the roller tables onto a stand-by or waiting bed or a cooling bed.

What is disadvantageous with all of these designs of transverse conveyor apparatuses is that the clearing or removal movement is accomplished over the entire width of the multi-strand continuous casting installation, and with a sensible working speed there is required a clearing or removal time which already amounts to the order of magnitude of the cycle time during cutting of the billets into short strand sections. This drawback could be compensated by increasing the clearing speed or velocity, but nonetheless such would constitute an appreciably increased expenditure in both energy and machinery costs.

SUMMARY OF THE INVENTION

Therefore, it is a primary object of the present invention to avoid the aforementioned drawbacks and limitations of the aforediscussed prior proposals advanced in this technology.

Another and more specific object of the present invention is to provide an improved method for the transverse conveying of strand sections of a multi-strand continuous casting installation and an improved transverse conveying apparatus, by means of which the time phases during which the finished cut strand sections are displaced transversely with respect to the roll-out direction is appreciably shortened.

Yet a further significant object of the present invention is directed to a new and improved method of, and apparatus for, transversely transporting strand sections in a highly reliable, efficient, accurate and speedy fashion.

Another important object of the present invention is concerned with an improved transverse conveying apparatus for a multi-strand continuous casting installation, which is relatively simple in construction and design, quite economical to manufacture, extremely reliable in operation, not readily subject to breakdown or malfunction, and requires a minimum of maintenance and servicing.

Now in order to implement these and still further objects of the invention, which will become more readily apparent as the description proceeds, the method aspects of the present development are manifested by the features that the strand sections located rearward of the last outfeed line, viewed in the transverse conveying direction, are transported away by partial conveying displacement movements or strokes starting from their starting position through one or a number of intermediate positions located between two neighboring outfeed lines.

As alluded to above, the invention also concerns an apparatus for the performance of the inventive method and is manifested by the features that, the number of transport elements, typically transport pawls, corresponds at least to the sum of the number of cast strands and the number of intermediate positions of the transversely conveyed strand sections, typically for instance billets, between the strands, and that the maximum path for the transverse movement of the transport pawls corresponds to the spacing between two neighboring strands.

The number of partial conveying displacement movements or strokes for the strand sections of a strand corresponds to the ordinal number of such strand, beginning with one for the last strand viewed in the conveying or transport direction.

According to two different embodiments of the invention the lengths of the partial conveying displacement movements or strokes, either for billets of the strand having the ordinal number one as well as for all billets between the strands with the ordinal number one and two, amount to essentially the distance d of two neighboring strands, and the lengths of the transverse conveying strokes or displacement movements for all remaining billets amounts to the product of the distance between two strands and the factor $(N-1)/N$, wherein N designates the number of strands, or all partial conveying displacement movements or strokes amount to the spacing between two neighboring strands multiplied by the factor N/(N+1), wherein all effective lengths are increased by a safety spacing or distance for the upward tilting or shifting of the transport pawls.

The transport pawls or pawl members are pivotably mounted about axes extending essentially parallel to the lengthwise direction of the strand sections, and by means of springs or an appropriate counter weight are brought into a vertical position engaging the strand section. During the return movement or transport of the pawl members, following a transverse conveying displacement movement or stroke, these pawl members are retracted into a rest or ineffectual position by pivoting them into a substantially horizontal position beneath the forward strand sections, viewed in the transverse conveying direction.

The transport pawl members are divided into groups of ascending number, starting with one for the first group in the transverse conveying direction up to the number of cast strands, and each group of transport pawls is arranged at a transport carriage or dolly or the like operatively associated therewith. The number of transport carriages corresponds to the number of strands.

To generate the transverse conveying displacement movements there is provided a displacement device which engages with the last transport carriage viewed in the transverse conveying direction.

The transmission of the transverse movement of the last transport carriage to the remaining transport carriages is accomplished by means of a guide lever possessing an elongate hole or slot. Either the last or the next to last transport carriage is mounted in the elongate hole. The first to the next to last transport carriages are rigidly connected by means of a rod member. By means of the elongate hole there is possible a relative movement between the last and next to last transport carriages, the length of which is equal to the spacing or distance between two strands divided by the number of strands.

Furthermore, the last transport carriage possesses an additionally reinforced transport pawl member or equivalent structure for off-loading or displacing away a plurality of strand sections from the last transport carriage which during the previous displacement movement were deposited at the region of the end or terminal position of the transport pawl members. To ensure that the cut newly arriving billets do not disturb the transverse conveying operation, the billets arriving during a transverse conveying displacement movement or stroke are retained externally of the region of the transverse transfer or transport by means of a holder mechanism which can be brought by a control device from a rest position into a work position.

According to one construction of the invention all of the transport pawl members are arranged upon a common support or carrier and the displacement path equals $s' = d \cdot N/(N+1)$.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the invention in greater detail, the inventive method, in principle, resides in the fact that there is not carried out, as was heretofore conventional practice, a single clearing or removal movement over the entire multi-strand casting installation. Rather, the individual strand sections within a partial transport or conveying stroke are brought from their starting position, which corresponding to the illustrated strands 1, 2, 3 and 4 of a four-strand billet installation arrive at the same spacing d with respect to one another, into the region between their starting position and that of the neighboring strand (in the transverse conveying direction). In the illustrated installation the transverse conveying direction extends from the left towards the right. During the next following partial conveying displacement movement or stroke the already once displaced billets, which are now located between two strands n and n−1, wherein n signifies any random one of the numbers one to four of the strands, are further displaced between the strands n−1 and n−2, and the new arriving billets are again displaced as above described. This continues for such length of time until the billets following the relevant number of partial conveying steps, corresponding to the ordinal number of the strand from which they are derived, come to lie laterally of the outfeed roll or roller table and then are subsequently further shifted towards the right.

Figure 1:
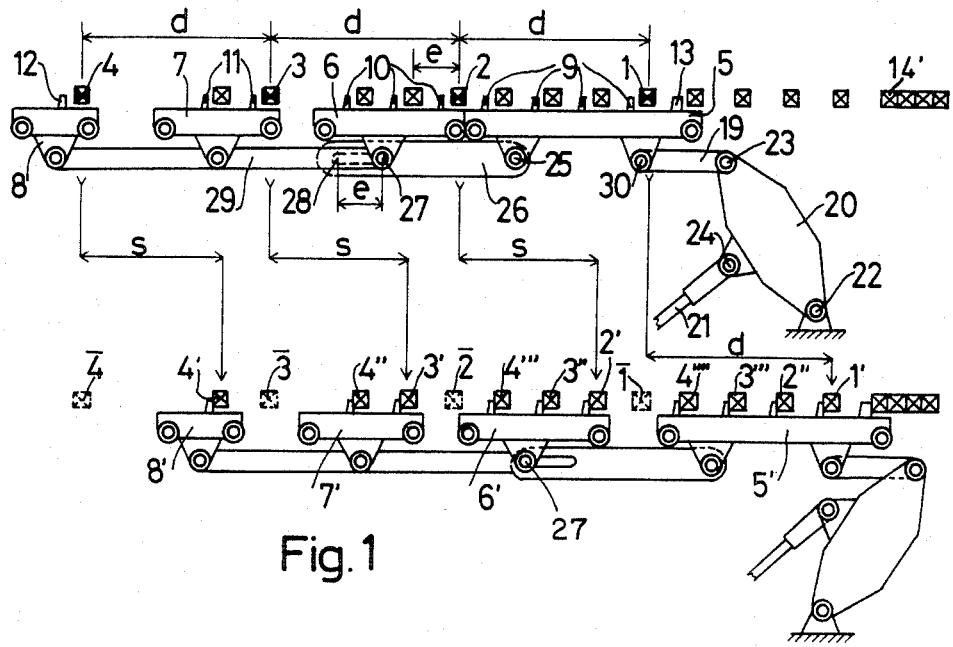
FIG. 1 illustrates an exemplary embodiment of transverse conveyor apparatus in two different working or operating phases, wherein the displacement of the strand sections has been conveniently indicated by arrows in order to simplify and improve the clarity of the illustration.

Now in FIG. 1 there has been illustrated the transverse conveyor apparatus in two different positions. The upper position corresponds to the rest position and the lower position to the terminal or end position. If a clearing or removal operation is not intended to be accomplished then the equipment is located in the rest position where the transport carriages or dollies 5, 6, 7 and 8 or equivalent structure are arranged such that the transport elements, here the transport pawls, located in each instance momentarily furthest towards the right of the groups 9, 10, 11 and 12 are positioned at a slight spacing to the left of the strands 1, 2, 3 and 4 and which spacing ensures for the upward tilting of the pawl members. The transport carriages 6, 7 and 8 are rigidly interconnected by a rod member 29 or other appropriate connection means and only can be simultaneously or conjointly moved. The transport carriage 5 is connected with the transport carriage 6 by a guide lever or lever member 26 provided with an elongate hole or opening 28 in which there is guided the hinge point or pivot 27 with a freedom of mobility of a length e. The same purpose also could be accomplished if the bearing 25 of the transport carriage 5 were guided in an elongate hole or slot. A second bearing 30 of the transport carriage 5 is operatively coupled by means of two pivotal levers 19 and 20, which are interconnected with one another by means of a hinge or pivot joint 23, with a rod member 21 which is connected by means of a hinge or pivot joint 24 with the lever member 20. This rod member 21 can be driven by a not particularly illustrated fluid operated, for instance hydraulic piston-cylinder unit or an eccentric drive or equivalent drive structure in such a manner that it pivots the pivotal lever or lever member 20 into the position depicted in the lower portion of the illustration of FIG. 1. The lever member 20 is stationarily mounted by means of a hinge or pivot joint 22 and during such pivotal movement draws along therewith the lever member 19 and thus the transport carriage 5.

Due to the direct pivotal connection of the transport carriage 5 with the lever member 19 this transport carriage 5 moves through a partial displacement path or displacement increment amounting to the length of the elongate hole or opening 28 before the remaining transport carriages 6, 7 and 8, along with the transport carriage 5, also move towards the right. The reason for such unequal displacement paths or shifts of the transport carriages resides in the fact that only the billets located between the strands 1 and 2 should be displaced through a complete or whole distance d towards the right, since otherwise a billet from its starting position, for instance the billet of the strand 4, would come to lie exactly at the starting position of a billet of the strand 3. The difference in the displacement paths is equal to the length e of the elongate hole or opening 28 and amounts to exactly the quotient of the strand spacing or distance d and the number of strands. The displacement path of the transport carriages 6, 7 and 8 therefore amounts to $s = d \cdot (N-1)/N$.

An alternative solution to this difference in the displacement paths would be to allow all of the displacements to occur through the distance or path $s' = d \cdot N/(N+1)$, provided that the distance d is large enough in order to afford space for all of the N-billets.

The billets illustrated in the end or terminal position of the equipment, depending upon their derivation, are designated by the ordinal numbers of the corresponding strands and the prime markings or indexes relate to successive transverse drag cycles.

After the start of the casting operation the first four billets of the strands 1, 2, 3 and 4 arrive at the transverse conveying region and are displaced by the first partial transport or conveying stroke into the positions 1', 2', 3' and 4'. The positions $\overline{1}$, $\overline{2}$, $\overline{3}$ and $\overline{4}$ are now empty and thus there can be infed four new billets to the transverse conveying region. The transport carriages 5, 6, 7 and 8 are shifted back into their rest position, and the pivotably mounted transport pawl members 9, 10, 11 and 12 and the displacement pawl member 13 drop or move below the billets which have been transversely shifted or displaced during the preceding cycle. During the next partial displacement stroke or path the four newly arriving billets are shifted in the same manner as previously were shifted the first four billets which have now been displaced into the positions 2'', 3'', 4''. The strand section 1'' is no longer here discussed since it is now already located in the displaced together row 14' of billets. The strand sections 1''', 2''', 3''' and 4'''' are displaced in each case during the following displacement stroke by means of the displacement pawl member 13 into the coherent row 14', from which they are then further transported by not particularly illustrated transport devices.

Figure 2:
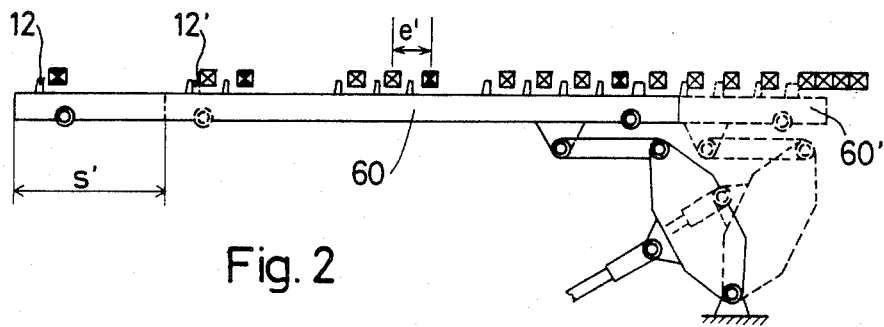
FIG. 2 depicts a different construction of transverse conveying apparatus, wherein all of the pawl members have the same displacement path.

FIG. 2 illustrates a different construction of the invention, wherein here all of the transport carriages are grouped together into a single carrier or support which displaces all of the transport pawl members through the same path or distance. This design can be employed with an n-fold multi-strand continuous casting installation which still possesses sufficient space between two strands in order to ensure for the engagement of the pawl members between two billets when the spacing or distance e' between the billet center points amounts to $e' = d/(N+1)$. The support or carrier 60 could also consist of a rod, a traction chain or a cable. By means of the displacement device, which is identical to that shown in FIG. 1, the carrier 60 is displaced into the position 60', the transport pawl member 12 is shifted into the phantom line position 12', and the billet 4 is displaced into the position of the billet 4'. The other billets are analogously displaced.

Figure 3:
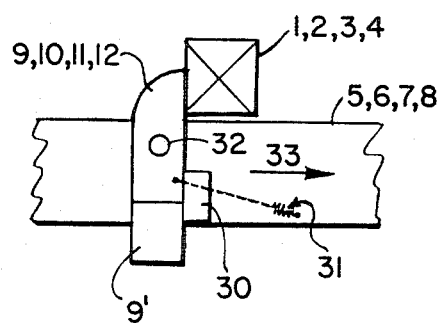
FIG. 3 schematically shows the transport pawl according to the invention in an engaging position on an enlarged scale.
Figure 4:
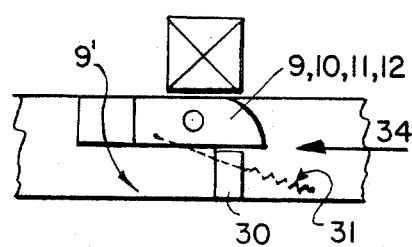
FIG. 4 shows the transport pawl of FIG. 3 in a retracted, returning position.

The operation of the transport pawl will be clear from FIGS. 3 and 4. In a forward or transporting motion, the transport pawl assumes its substantially vertical equilibrium position and extends above the conveyor device for engaging a strand section to be transported to the right as seen in FIG. 3. In a reverse or returning motion, the transport pawl eventually strikes a strand section in an intermediate rest position and is thereby deflected to a substantially horizontal retracted or inoperative position enabling it to pass beneath the strand section for engaging the opposite side of such strand section for transporting it to the right as seen in FIG. 4 in a subsequent transport stroke. In a preferred embodiment the transport pawl 9 comprises a counterweight 9' which causes the pawl 9 to cooperate with a pivot pin 32 mounted on transport elements 5, 6, 7 or 8 of the conveyor device to give the pawl 9 an upright equilibrium position. A stop member 30 is provided on the transport elements 5, 6, 7 or 8 to limit the counterclockwise rotation of the pawl 9 when engaging and transporting a strand section 1, 2, 3 or 4 as seen in FIG. 3. It will be seen in FIG. 4 that during a return stroke of the transport element 5, 6, 7 or 8 the strand section 1, 2, 3 or 4 in a rest position overcomes the force of the counterweight 9' and causes the transport pawl 9 to rotate about 90° in the clockwise direction as seen in FIG. 4.

In an alternate embodiment, the counterweight may be omitted and spring means 32 indicated in broken line in FIGS. 3 and 4 may be mutually attached to the transport pawl 9 and the transport element 5, 6, 7 or 8 to impart a force to the transport pawl 9 tending to rotate it in a counterclockwise direction as seen in FIG. 3 in a manner equivalent to the action otherwise provided by the counterweight 9'.

To safeguard the installation against the introduction of newly arriving billets into the transverse conveying or transport region during a partial conveying stroke, there is advantageously provided a holder or holdback mechanism which, during a displacement stroke, shuts-off the drive of the already cut billet, or else blocks the billet forwardly of the transverse conveying or transport region. A control of the transport conveying cycle is likewise conceivable as a function of the expected arrival times of new billets and is well within the knowledge of those skilled in the art.

While there are shown and described present preferred embodiments of the invention, it is to be distinctly understood that the invention is not limited thereto, but may be otherwise variously embodied and practiced within the scope of the following claims.

What I claim is:

1. A method of transversely conveying strand sections especially billets, of a multi-strand continuous casting installation onto a neighboring cooling bed, comprising the steps of:
   longitudinally outfeeding strand sections from the casting installation to a transverse conveying apparatus;
   transversely conveying the strand sections by repeatedly advancing the strand sections located rearward of a last outfeed line, viewed in the transverse conveying direction, substantially at a right angle to the direction of longitudinal feed through a distance less than a lateral spacing of the strand sections in partial conveying displacement strokes starting from their starting position through one or a number of intermediate positions located between two neighboring outfeed lines; and
   substantially simultaneously conveying at least said strand sections located in a penultimate outfeed line and rearwards thereof.

2. The method as defined in claim 1, wherein:
   the number of partial conveying displacement strokes for the strand section of a strand corresponds to the ordinal number of such strand starting with one for the last strand viewed in the transverse conveying direction.

3. The method as defined in claim 2, wherein:
   the lengths of the partial conveying displacement strokes for the strand sections of said penultimate outfeed line and strand sections located rearward thereof, viewed in the transverse conveying direction, are essentially equal to the distance (d) between two strands multiplied by the factor $(N-1)/N$, wherein N represents the number of strands; and
   the last partial conveying displacement stroke for all of the strand sections and the single transverse conveying displacement stroke for a strand section of the last strand is essentially equal to the spacing between two strands.

4. The method as defined in claim 2, wherein:
   all of the partial conveying displacement strokes are essentially equal to the spacing (d) multiplied by the factor $N/(N+1)$, where N represents the number of strands.

5. A transverse conveying apparatus for strand sections of strands cast at a multi-strand continuous casting plant, comprising:
   transport carriage means movable along a displacement path out of a rest position into a displaced position for simultaneously transporting a plurality of strand sections from a plurality of initial outfeed positions in a transverse conveying direction through at least one intermediate position into a terminal position;
   a plurality of transport pawl members mounted on said transport carriage means for substantially simultaneously engaging a plurality of the strand sections along said displacement path;
   said transport pawl members amounting in number to at least the sum of the number of the cast strands plus the number of intermediate positions of the transported strand sections between the initial outfeed positions of the strands;
   means for bringing the transport pawl members into a position engaging the strand sections and, during a reverse transport movement of the transport carriage means following a transverse partial conveying displacement stroke, retracting said transport pawl members into a position beneath the strand sections;
   said transport pawl members being divided into grous of increasing number starting with 1 for the first group in the transverse conveying direction up to the number of cast strands; and
   a displacement device for engaging with the transport carriage means in order to generate the transverse partial conveying displacement strokes.

6. The transverse conveying apparatus as defined in claim 5, wherein:
   a maximum displacement path for said partial conveying displacement stroke of the transport carriage means approximately corresponds to a predetermined distance between two neighboring initial outfeed positions of the strand sections.

7. The transverse conveying apparatus as defined in claim 5, further including:
   means for pivotably mounting said transport pawl members about axes extending essentially parallel to a lengthwise direction of extent of the strand sections; and
   said means for bringing the transport pawl members placing said transport pawl members into a substantially vertical position engaging the strand sections and, during a reverse transport movement of the transport carriage means following a partial conveying displacement stroke, retracting said transport pawl members into an inoperative position by pivoting said transport pawl members into a substantially horizontal position beneath the strand sections.

8. The transverse conveying apparatus as defined in claim 5, wherein:
   said transport carriage means comprises a plurality of interconnected transport carriages corresponding in number to the number of cast strands;
   said transport pawl members being arranged in a predetermined number of groups; and
   each group of transport pawl members being arranged upon one of said transport carriages.

9. The transverse conveying apparatus as defined in claim 5, wherein:
   said initial outfeed position defines an initial outfeed position for a plurality of strand sections arriving from the continuous casting plant;
   said displacement path of said transport carriage means being oriented at substantially right angles to an arrival direction of said strand sections; and
   said transport pawl members engaging each of said plurality of arriving strand sections substantially simultaneously and transporting the latter along said displacement path through said partial conveying displacement stroke.

10. The transverse conveying apparatus as defined in claim 5, further including:
    common support means upon which there are arranged all of said transport pawl members; and
    the displacement path of all of said transport pawl members is essentially equal to the distance $s' = d \cdot N/(N+1)$, wherein N represents the number of cast strands.

11. The transverse conveying apparatus as defined in claim 8, wherein:

said bringing means comprise spring means.

12. The transverse conveying apparatus as defined in claim 8, wherein:

said bringing means comprise counter weight means.

13. The transverse conveying apparatus as defined in claim 8, wherein:

one of said transport carriages is rigidly connected by means of a transverse rod member with all rearward located transport carriages as viewed in the transverse conveying direction;

another of said transport carriages being connected by means of a guide lever with a pivot point of the one transport carriage which is rigidly connected by means of the transverse rod member with all forwardly located transport carriages;

said guide lever having an elongate hole;

said pivot point being movable in said elongate hole of the guide lever which allows for a relative movement between the transport carriages; and said relative movement essentially corresponding to the distance (d) between two neighboring cast strands divided by the number of cast strands.

14. The transverse conveying apparatus as defined in claim 8, wherein:

one of said transport carriages is rigidly connected by means of a transverse rod member with all rearward located transport carriages as viewed in the transverse conveying direction;

another of said transport carriages being connected by means of a guide lever with a pivot point of the one transport carriage which is rigidly connected by means of the transverse rod member with all forwardly located transport carriages;

said guide lever having an elongate hole;

said another transport carriage being provided with pivot means;

said pivot means being movable in said elongate hole of the guide lever which allows for a relative movement between the transport carriages; and said relative movement essentially corresponding to the distance (d) between two neighboring cast strands divided by the number of cast strands.

15. The transverse conveying apparatus as defined in claim 13, wherein:

said anoher transport carriage is provided with an additionally reinforced transport pawl member for displacing away a number of strand sections which have been deposited by said another transport carriage, during a preceding displacement stroke, at the region of the terminal position of the transport pawl members.

16. A method of transversely conveying strand sections, especially billets, of a multi-strand continuous casing plant located rearwards of a last outfeed line viewed in a transverse conveying direction onto a neighboring cooling bed, comprising the steps of:

longitudinally outfeeding strand sections from the casting installation to a transverse conveying apparatus;

transversely conveying the strand sections by repeatedly advancing the strand sections substantially at a right angle to the direction of longitudinal feed through a distance less than a lateral spacing of the strand sections in a first partial conveying stroke from an initial outfeed position to an intermediate rest position; and substantially simultaneously conveying at least said strand sections located in a penultimate outfeed line and rearwards thereof through at least one further partial conveying stroke from said intermediate rest position past at least one further outfeed position to a terminal position in the cooling bed.

* * * * *

UNITED STATES PATENT AND TRADEMARK OFFICE
CERTIFICATE OF CORRECTION

PATENT NO. : 4,523,672

DATED : June 18, 1985

INVENTOR(S) : CARLOS ROS NAVARRO

It is certified that error appears in the above—identified patent and that said Letters Patent is hereby corrected as shown below:

Column 10, line 20, please delete "casing" and insert --casting--

Column 10, line 11, please delete "anoher" and insert --another--

Signed and Sealed this

Eighth Day of October 1985

[SEAL]

Attest:

DONALD J. QUIGG

Attesting Officer

*Commissioner of Patents and Trademarks—Designate*